(12) United States Patent
Omar

(10) Patent No.: US 9,400,928 B2
(45) Date of Patent: Jul. 26, 2016

(54) METHOD OF COMPENSATING FOR SIGNAL DEGRADATION IN TRANSMISSION SYSTEMS

(71) Applicant: Omarco Network Solutions Limited, Douglas (GB)

(72) Inventor: Ralph Mahmoud Omar, Douglas (GB)

(73) Assignee: Omarco Network Solutions Limited, Douglas, Isle of Man, British Isles (GB)

( * ) Notice: Subject to any disclaimer, the term of this patent is extended or adjusted under 35 U.S.C. 154(b) by 0 days.

(21) Appl. No.: 14/646,979

(22) PCT Filed: Nov. 25, 2013

(86) PCT No.: PCT/GB2013/053310
§ 371 (c)(1),
(2) Date: May 22, 2015

(87) PCT Pub. No.: WO2014/080231
PCT Pub. Date: May 30, 2014

(65) Prior Publication Data
US 2015/0295605 A1    Oct. 15, 2015

(30) Foreign Application Priority Data

Nov. 23, 2012  (GB) .................................. 1221183.5
Dec. 11, 2012  (GB) .................................. 1222266.7

(51) Int. Cl.
*H04L 27/06*     (2006.01)
*G06K 9/00*      (2006.01)
(Continued)

(52) U.S. Cl.
CPC .......... *G06K 9/00577* (2013.01); *G06Q 20/045* (2013.01); *G06Q 20/385* (2013.01);
(Continued)

(58) Field of Classification Search
CPC ............................... H03M 5/02; H04L 1/0045
USPC .................................................. 375/340, 316
See application file for complete search history.

(56) References Cited

U.S. PATENT DOCUMENTS 5,859,664 A  *  1/1999  Dent ...................... H04B 1/713
                                                        348/21
6,330,672 B1 * 12/2001  Shur ...................... G06T 1/0028
                                                        375/E7.089

(Continued)

FOREIGN PATENT DOCUMENTS

WO      2011161660 A2   12/2011

OTHER PUBLICATIONS

ISR/WO mailed May 9, 2014 for PCT/GB2013053110 filed Nov. 25, 2013, 8 pages.

*Primary Examiner* — Helene Tayong
(74) *Attorney, Agent, or Firm* — Armstrong Teasdale LLP

(57) ABSTRACT

A method for compensating for transmission channel distortion effects for a data signal transmitted from a first computing device via the transmission channel to a second computing device is provided. The method includes combining the data signal with a reference marker, the reference marker including predetermined signal parameters, to create a composite data signal, transmitting the composite data signal from the first computing device to the second computing device, extracting the reference marker and the data signal from the received composite data signal received at the second computing device, analyzing the signal parameters of the extracted reference marker, comparing the analyzed signal parameters of the extracted reference marker with the predetermined signal parameters of the reference marker in order to determine transmission channel distortions, and adjusting the extracted data signal based on the determined transmission channel distortions in order to compensate for transmission channel distortion effects.

16 Claims, 4 Drawing Sheets

(51) Int. Cl.
  *G07F 17/42*  (2006.01)
  *G06Q 20/04*  (2012.01)
  *G06Q 20/38*  (2012.01)
  *G07B 15/00*  (2011.01)
  *G07F 7/10*  (2006.01)
  *H04K 1/10*  (2006.01)
  *H04B 1/10*  (2006.01)
  *H04K 1/02*  (2006.01)

(52) U.S. Cl.
  CPC ............ *G07B 15/00* (2013.01); *G07F 7/1066* (2013.01); *G07F 17/42* (2013.01); *H04B 1/1027* (2013.01); *H04K 1/02* (2013.01); *H04K 1/10* (2013.01); *G06K 2009/0059* (2013.01)

(56) References Cited

U.S. PATENT DOCUMENTS

| | | | |
|---|---|---|---|
| 6,400,826 | B1 | 6/2002 | Chen et al. |
| 6,567,533 | B1 * | 5/2003 | Rhoads ............ G06F 17/30876 |
| | | | 382/100 |
| 2004/0181671 | A1 | 9/2004 | Brundage et al. |

* cited by examiner ered to as a coordinate measurement frame), to time coordinate values expressed with respect to the receiving terminal's adopted measurement coordinate domain.

METHOD OF COMPENSATING FOR SIGNAL DEGRADATION IN TRANSMISSION SYSTEMS

CROSS REFERENCE TO RELATED APPLICATIONS

This application is a National Stage Entry of PCT/GB2013/053110, filed Nov. 25, 2013, which claims priority to GB Patent Application No. 1221118.5, filed Nov. 23, 2012, and GB Patent Application No. 1222266.7, filed Dec. 11, 2012, all of which are incorporated herein by reference in their entirety.

BACKGROUND OF THE DISCLOSURE

The present invention relates to the field of secure data transmission and specifically to an improvement for steganographic methods of securely transmitting data between remotely located parties, such as set out in the applicant's co-pending patent application having publication number WO2011/161660.

Steganographic transmission methods comprise hiding 'useful' information within extraneous information. The useful information may be recovered by a recipient (e.g. a receiving terminal) if the position of the useful information within a received transmission signal is known.

The applicant's co-pending patent application having publication number WO2011/161660, which is incorporated herein by reference insofar as permitted by the relevant national law, provides an improved steganographic transmission method. The position of the useful information is provided by an identification variable. This identification variable is usually transferred along with the steganographic transmission signal to an intended receiving terminal. The identification variable may be expressed as one or more coordinates defined with respect to a terminal's selected coordinate measurement domain. The confidentiality of the hidden useful information is maintained provided that the coordinate measurement domain with respect to which the identification variable coordinates are defined is unknown to an eavesdropper.

An intended receiving terminal is able to recover the useful information comprised within the received signal if the receiving terminal is provided with a coordinate transform enabling conversion of the received identification variable coordinates into the coordinate measurement domain adopted by the receiving terminal.

For example, and in order to better illustrate the transmission method of the applicant's co-pending application, FIG. 1 illustrates a sending terminal 40 provided with a clock 42—Clock A—which clock measures irregular time intervals. In other words, the sending terminal's clock 42 measures the passage of time differently than a standard clock. For example, the sending terminal's clock may be accelerated, in which case the clock 42 may indicate a passage of time of five seconds, when in reality with respect to standard time, only one second has lapsed. Similarly, the sending terminal's clock 42 may be slower than standard time, in which case an indicated time lapse of one second may correspond to a time lapse of five seconds in standard time. In short, without knowledge of the sending terminal's adopted coordinate measurement domain, an eavesdropper 44 cannot make sense of the identification variable coordinate, and therefore cannot recover the useful information from the intercepted signal.

The receiving terminal 46 is provided with its own clock 48—Clock B. The receiving terminal 46 is provided with a coordinate transform matrix M which maps coordinate values, in this case time coordinates, expressed with respect to the sending terminal's adopted measurement coordinate domain (also referred to as a coordinate measurement frame), to time coordinate values expressed with respect to the receiving terminal's adopted measurement coordinate domain.

The transmitted message is forwarded from the sending terminal 40 to the receiving terminal 46 along with the coordinates {a,b} which define the position of the concealed useful information expressed with respect to the sending terminal's adopted coordinate measurement domain. For example, expressed with respect to the time domain of the sending terminal 40. Upon receipt of the message and associated coordinates {a,b} the receiving terminal uses the coordinate transform M to express the received coordinates in its own measurement coordinate frame. In the illustrated example of FIG. 1, this comprises expressing the received time coordinates with respect to its own clock 48.

The eavesdropper 44 is unable to recover the concealed useful information in the absence of a coordinate transform which converts coordinates expressed with respect to the sending terminal's confidential measurement coordinate frame, into coordinates expressed with respect to the eavesdropper's adopted coordinate measurement frame.

Such a described steganographic transmission method does not take into account signal distortion, including attenuation effects such as amplitude damping, and time distortion such as pulse broadening. Over short transmission distances the signal distortion may be negligible. However, over long transmission distances the effects may be noticeable, and may increase data transmission error rates. The reason is that the coordinate transform M may not compensate for signal distortion. The result is that when the received identification variable values are expressed with respect to the receiving terminal's selected frame of reference, the recalculated coordinate values may no longer accurately indicate the actual position of the useful information within the received signal. The introduced signal distortion effects, in particular distortion in the signal's time domain, is analogous to an introduced coordinate shift, which is not accounted for in the receiving terminal's adopted coordinate transform M.

Accordingly, the embodiments described herein provide a means and method for improving the fidelity of transmission methods and in particular the afore-described steganographic transmission method, and specifically provide a means for accounting for signal distortion effects acquired during signal transmission.

BRIEF DESCRIPTION OF THE DISCLOSURE

In a first aspect, there is provided a method for compensating for transmission channel distortion effects for a data signal transmitted from a first computing device via the transmission channel to a second computing device The method includes combining the data signal with a reference marker, the reference marker including predetermined signal parameters, to create a composite data signal, transmitting the composite data signal from the first computing device to the second computing device, extracting the reference marker and the data signal from the received composite data signal received at the second computing device, analysing the signal parameters of the extracted reference marker; comparing the analysed signal parameters of the extracted reference marker with the predetermined signal parameters of the reference marker in order to determine transmission channel distortions, and adjusting the extracted data signal based on the determined transmission channel distortions in order to compensate for transmission channel distortion effects.

Conveniently the reference marker may include a unique bit string in order to make the reference marker clearly distinguishable from the rest of the data signal. To improve the confidentiality of the transmission from the first to the second computing devices the unique bit string may conveniently only be known to the first and second computing devices, e.g. a shared bit string could be provided at the point of manufacture.

To further improve the security of the transmission between the computing devices the reference marker may include a one-time use bit string. Further, the first and second computing devices may include a look up table containing valid one-time use bit strings for use as reference markers. The method may further include marking a bit string as used in the look up table when it is combined with the data signal (or when it is first received at the second computing device). The second computing device may then be arranged to cross check the bit string of the received reference marker against its look up table and flag a received data signal as fraudulent (and/or compromised) in the event that the reference marker has already been marked as used.

The method may also be used in a stenographic embodiment in which the combining step may comprise combining communication information with extraneous information to create the data signal. Conveniently, the data signal may comprise a packet of communication information and the combining step may comprise placing a start reference marker at the start of a packet of communication information and/or may comprise placing an end reference marker at the end of a packet of communication information in order to clearly distinguish the communication information (the "message" within the data signal) from the extraneous information.

To further improve security the extraneous information may be associated with reference markers which may be distinguishable from markers associated with communication information. As such communication information may be associated with a reference marker according to a first marker type and extraneous information may be associated with a reference marker according to a second marker type.

Each first marker type reference marker may be paired with a second marker type reference marker. By associating certain reference markers used with the communication information with reference markers used for extraneous information it may be possible to provide a further level of security. For example if a received transmission includes a reference marker that is used to indicate communication information but does not include a valid extraneous marker then this may be indicative of a fraudulent or compromised transmission.

The method may therefore further include checking, at the second computing device, the received composite signal to determine if each first marker type reference marker is present within the composite data signal with its paired second marker type reference marker. The method may further include flagging a received data signal as fraudulent in the event that a first marker type reference marker is not present with a paired second marker type reference marker within the composite data signal.

Reference markers may be generated in accordance with a reference marker algorithm. The method may further include checking, at the second computing device, received reference markers to determine if they are consistent with the reference marker algorithm. A received data signal may then be flagged as fraudulent in the event that the received reference marker is not consistent with the reference marker algorithm.

The comparing step may include analysing signal parameters of the extracted reference marker to determine attenuation effects of the transmission channel and/or analysing signal parameters of the extracted reference marker to determine pulse broadening effects of the transmission channel.

In a second aspect, there is provided a system for compensating for transmission channel distortion effects for a data signal transmitted from a first computing device via the transmission channel to a second computing device. The system includes a combining module arranged to combine the data signal with a reference marker, the reference marker including predetermined signal parameters, to create a composite data signal, a transmitting module arranged to transmit the composite data signal from the first computing device to the second computing device, an extraction module arranged to extract the reference marker and the data signal from the received composite data signal received at the second computing device; an analysing module arranged to analyse the signal parameters of the extracted reference marker, a comparison module arranged to compare the analysed signal parameters of the extracted reference marker with the predetermined signal parameters of the reference marker in order to determine transmission channel distortions, and an adjustment module arranged to adjust the extracted data signal based on the determined transmission channel distortions in order to compensate for transmission channel distortion effects.

In a third aspect, there is provided a method for compensating for transmission channel distortion effects for a data signal received from a first computing device via the transmission channel at a second computing device. The method includes receiving, at the second device, a composite data signal from the first computing device, the composite data signal including the data signal and a reference marker and the reference marker including predetermined signal parameters, extracting the reference marker and the data signal from the received composite data signal, analysing the signal parameters of the extracted reference marker; comparing the analysed signal parameters of the extracted reference marker with the predetermined signal parameters of the reference marker in order to determine transmission channel distortions, and adjusting the extracted data signal based on the determined transmission channel distortions in order to compensate for transmission channel distortion effects.

In a fourth aspect, there is provided a receiver for compensating for transmission channel distortion effects for a data signal received from a first computing device via the transmission channel. The receiver includes an input arranged to receive a composite data signal from the first computing device, the composite data signal including the data signal and a reference marker and the reference marker including predetermined signal parameters, an extraction module the reference marker and the data signal from the received composite data signal, an analysis module arranged to analyse the signal parameters of the extracted reference marker, a comparison module arranged to compare the analysed signal parameters of the extracted reference marker with the predetermined signal parameters of the reference marker in order to determine transmission channel distortions, an adjustment module arranged to adjust the extracted data signal based on the determined transmission channel distortions in order to compensate for transmission channel distortion effects.

The second, third and fourth aspects may include, where appropriate, the features of the first aspect.

The embodiments described herein may extend to a first computing device for transmitting a composite data signal in accordance with the first aspect.

The first computing device (transmitter) and second computing device (receiver) may include computer terminals or mobile communications devices such as mobile telephones or smart devices (e.g. iPhone, iPad, Android or MS Windows devices).

The embodiments described herein extend to a carrier medium for carrying computer readable code for controlling a computing device (e.g. a transmitter, receiver, mobile telecommunications device such as a mobile telephone or smart device etc.) to carry out the method of the first aspect of the invention. The embodiments described herein extend to a carrier medium for carrying computer readable code for controlling a computing device to carry out the method of the third aspect.

BRIEF DESCRIPTION OF THE DRAWINGS

The present invention will be further described, by way of example, with reference to the accompanying drawings, in which.

DETAILED DESCRIPTION OF THE DISCLOSURE

The systems and methods described herein introduce a reference marker in the transmitted signal, which marker provides a reference point with respect to which an error correction may be determined by the receiving terminal. The error correction may subsequently be applied to the converted coordinates {a,b} in order to more accurately recover the concealed useful information.

Figure 1:
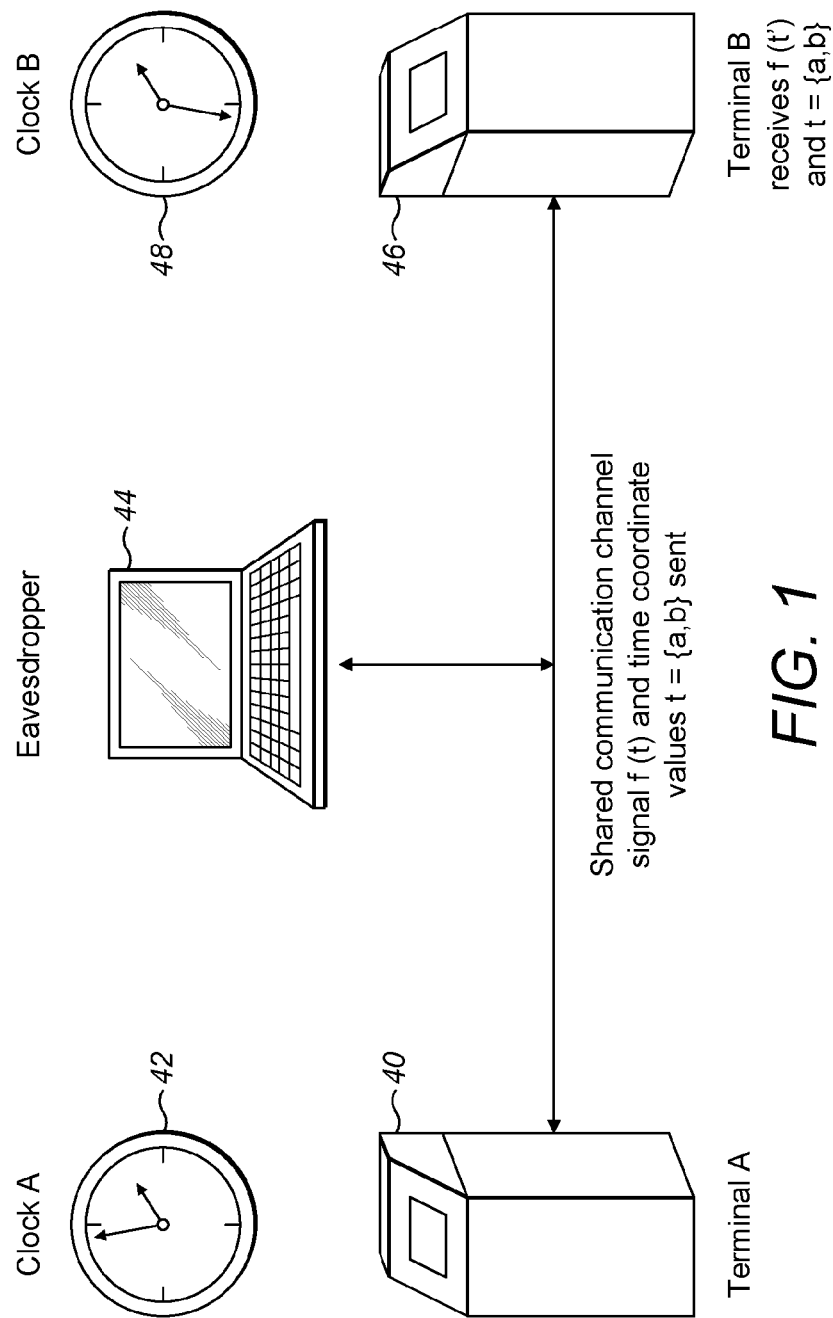
FIG. 1 illustrates a transmission system useful for understanding the disclosure.
Figure 2:
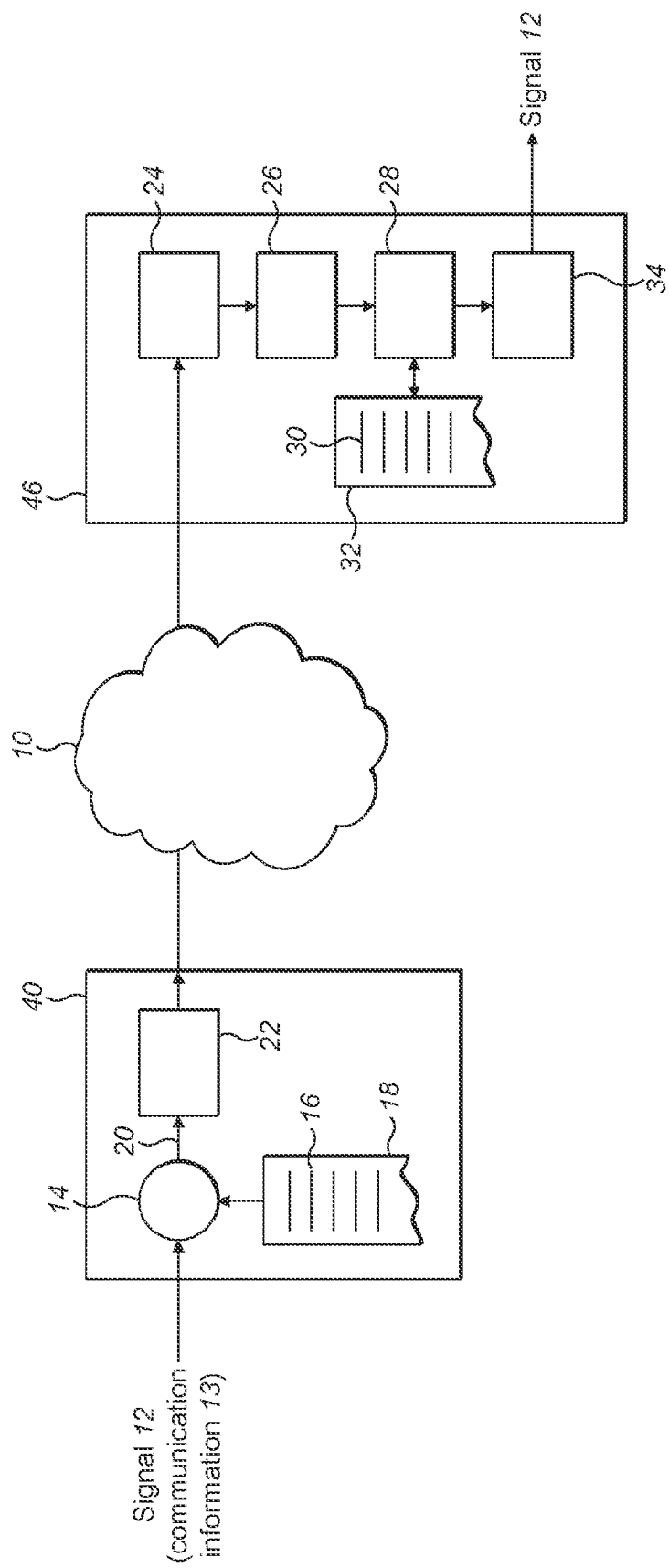
FIG. 2 illustrates an example transmission system.

FIG. 2 shows an example transmission system that includes a sending terminal 40 (terminal 40 may also referred to as a first computing device or transmitter), a receiving terminal 46 (terminal 46 may also be referred to as a second computing device or receiver) and a transmission channel 10.

The sending terminal receives a signal 12 and a combining module 14 combines the signal 12 with a reference marker 16 from a look up table 18. The composite signal 20 is passed to a transmitting module 22 which sends the composite signal 20 via the transmission channel 10 to the receiving terminal 46. At the receiving terminal 46, an extraction module 24 extracts the reference marker 16 and data signal 12 from the received signal and sends the reference marker for analysis in an analysis module 26 where the signal parameters of the reference marker are analysed.

A comparison module 28 then compares the analysed signal parameters with the predetermined signal parameters of the reference marker (the predetermined parameters 30 being stored in a look up table 32 along with the reference marker).

An adjustment module 34 then adjusts the extracted data signal to compensate for distortion in the transmission channel 10.

Figure 3:
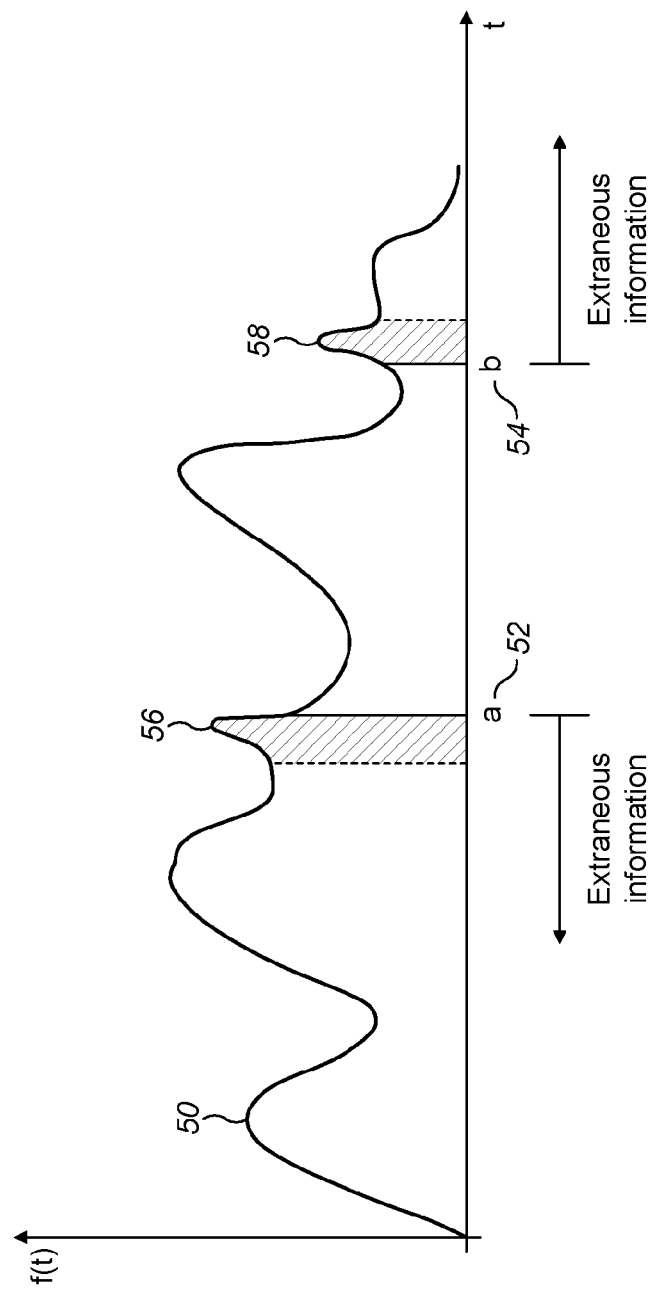
FIG. 3 illustrates a signal f(t) for transmission from a sending terminal 40 to a remotely located terminal 46.
Figure 4:
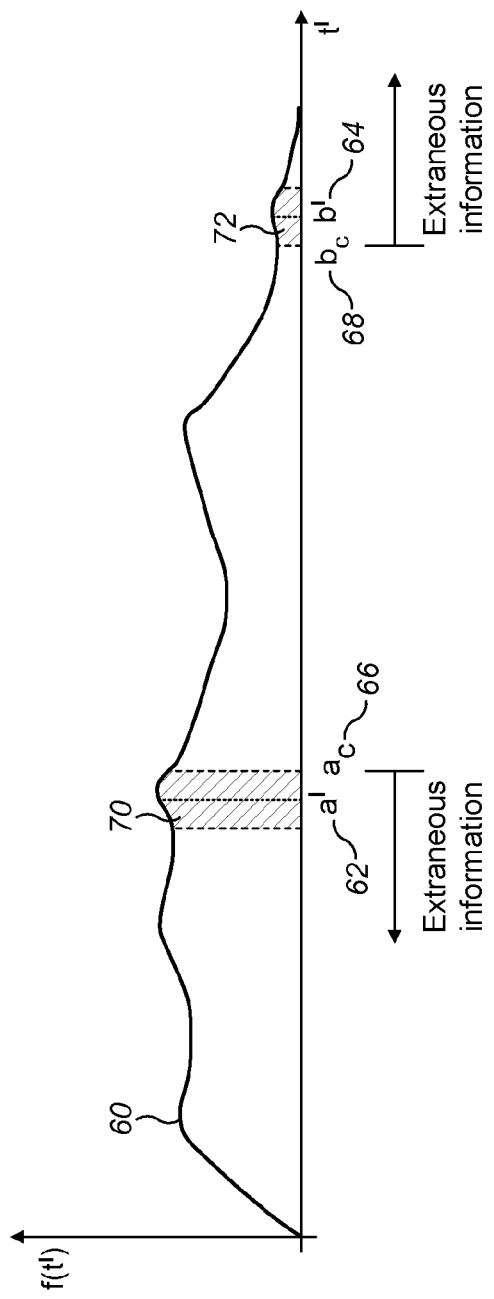
FIG. 4 illustrates a signal f(t') received at a remotely located terminal 46 from a sending terminal 40.

FIGS. 3 and 4 relate to a stenographic embodiment in which the combining module 14 above receives communication information 13 that it then combines with extraneous information to create the data signal 12 that is then combined with a reference marker 16. It is therefore noted that the signal 50 sent by the sending terminal below corresponds to the composite signal 20 in FIG. 2. The degraded signal 60 received by the receiving terminal 46 is then processed by modules 24, 26, 28 and 32.

FIG. 3 illustrates a signal f(t) 50 for transmission from the sending terminal 40 (see FIG. 2) to the remotely located terminal 46 (see FIG. 2). The signal 50 includes useful information, which is concealed between the coordinate values a 52 and b 54 as illustrated, whilst the remaining portions of the signal relate to extraneous information. The coordinate values a 52 and b 54 effectively demarcate the boundaries of the concealed useful information within the signal. It is to be appreciated that a signal may include one or more packets of concealed useful information. For present illustrative purposes, only one packet of useful information is illustrated as being concealed within the signal f(t) 50, however this is not be construed as a limitation, and any number of packets of useful information may be included within the signal f(t) 50; each concealed packet being associated with its own coordinates {a, b}.

An initial marker 56 is placed at the beginning of the useful information before the initial a 52 coordinate, and a second marker 58 is placed at the end of the useful information, after the b 54 end coordinate. The two markers 56, 58 effectively bound the useful information.

FIG. 4 illustrates the signal f(t') 60 received by the receiving terminal 46, and expressed with respect to the receiving terminal's measurement coordinate frame. The received signal 60 has experienced notable signal degradation during transit, including attenuation and pulse broadening.

Using the methods described in the applicant's co-pending patent application WO2011/161660, and specifically using the coordinate transform matrix M, the received coordinates {a,b} are expressed with respect to the receiving terminal's measurement coordinate frame as {a',b'} 62, 64. However, due to signal degradation the converted coordinates {a',b'} 62, 64 do not coincide with the boundary limits of the useful information, demarcated in FIG. 4 by boundary coordinates $a_c$ 66 and $b_c$ 68. As mentioned previously, the source for this disparity is that the applied coordinate transform matrix M may not take account of signal degradation effects as previously stated.

In the specific example illustrated in FIG. 4, the calculated coordinate measurement values {a',b'} 62, 64 fall within the reference marker region. Accordingly, unless the coordinate shifts resulting from signal degradation are taken into account, the recovered useful information will comprise erroneous data.

In order for the reference markers 70, 72 to provide a means for correcting the converted coordinates {a',b'} 62, 64, the reference markers 70, 72 need to be clearly distinguishable to the receiving terminal 46. One way of achieving this is to define the one or more markers 70, 72 as a unique confidential bit string which is only known to the sending terminal 40 and the receiving terminal 46. In this way, the maker is immediately identifiable by the receiving terminal 46.

For example, the sending terminal 40 and the receiving terminal 46 may be provided with the shared bit string at the point of manufacture. In this way, upon receiving the transmission signal 60, the receiving terminal 46 calculates the received coordinate measurement values with respect to its own coordinate frame of reference, and also scans the received signal 60 in order to identify the one or more markers 70, 72. Once identified, the receiving terminal 46 determines if the calculated coordinate values {a',b'} 62, 64 coincide with the boundary coordinates $a_c$ 66 and $b_c$ 68, which effectively means determining if the calculated coordinate values {a',b'} 62, 64 abut and are bounded by the markers 70, 72.

In certain embodiments, a single marker may be used, which marker could be placed at the beginning of the concealed useful information, in abutting relation with it—e.g. substantially as illustrated in FIG. 4 for marker 70—or, at the end of the concealed information, again in abutting relation therewith—e.g. substantially as illustrated for marker 72. Any disparity between the marker and the calculated coordinate values {a',b'} 62, 64 can be determined and used to correct the calculated coordinate values {a',b'} 62, 64. This solution works well where the different frequency components of the received signal 60 experience substantially uniform deformation in the time domain. Similarly, where the received signal 60 relates to one or more series of pulses, the present embodiment may be used where the pulse broadening is substantially uniform for each frequency component. In such scenarios each frequency component undergoes uniform deformation, therefore each calculated coordinate value {a',b'} 62, 64 will be offset by the same amount from the boundary coordinates $a_c$ 66 and $b_c$ 68, which they should be equivalent to. In other words, each coordinate will be shifted by the same amount in the time domain from the boundary coordinate it should be equivalent to. Therefore, knowledge of the disparity between one calculated coordinate value a' 62 and its associated boundary coordinate $a_c$ 66, enables determination of the required additional coordinate shift which needs to be applied to each calculated coordinate value {a',b'} 62, 64 to compensate for signal deformation effects, and specifically to compensate for substantially uniform time deformation effects.

Use of multiple markers may be preferable in embodiments where the transmitted signal 60 experiences non-uniform time deformation effects. In such embodiments, the different signal frequency components are deformed by different amounts in the time domain—the signal deformation in the time domain is frequency dependent. The skilled reader will appreciate that this is equivalent to stating that the signal deformation in the time domain is wavelength dependent, since frequency and wavelength are directly proportional. In such embodiments use of multiple markers framing each one of the one or more packets of useful information is likely to provide more accurate results, since each calculated coordinate {a',b'} 62, 64 may be associated with a different required corrective coordinate shift, to ensure equivalence with the associated boundary coordinate $a_c$ 66 and $b_c$ 68.

To further improve the security of the present method, the extraneous information may be associated with one or more markers. For present purposes and in order to distinguish them from the markers associated with the useful information, the markers associated with the extraneous information will be referred to as 'extraneous markers.' Similarly, markers associated with useful information will henceforth be referred to as 'useful markers.' The extraneous markers may be distinguishable from the markers associated with useful information, by being represented by a different bit string. In this way, upon receipt of the transmission signal 60, the receiving terminal 46 is able to analyse the received signal and identify and distinguish between useful markers and extraneous markers.

Where the bit strings used for each useful marker and extraneous marker are constant, in other words, the same bit string is used to represent a useful marker, and similarly the same bit string is used to represent each extraneous marker, yet is different to the bit string used to represent the useful marker, will introduce periodic patterns in the transmission signal. If an eavesdropper were to analyse a multitude of such signal transmissions between the sending terminal 40 and the receiving terminal 46, the recurring pattern may be observed due to the presence of the recurring constant markers. However, the confidentiality of the useful information is maintained since the eavesdropper will note know which markers are associated with useful information and which are associated with extraneous information.

Nonetheless, and to further improve security, the marker associated with the useful information may relate to a one-time use bit string. A one-time use bit string is used once by the sending terminal 40 and is subsequently discarded. In this way, the confidentiality of the marker is maintained, and periodic patterns are not introduced into the transmission signal. An eavesdropper cannot infer the marker using packet analysis techniques such as sniffing, due to the absence of any recurring patterns.

Both the sending terminal 40 and the receiving terminal 46 may be provided with a look-up table (18, 32) of valid one-time use marker bit strings (16, 30). Once a specific marker has been used in a transmission, it is removed from the table. If the receiving terminal 46 observes a previously used marker bit string being recycled, it may mark the transmission as fraudulent and/or compromised. Similarly, and for those embodiments where both useful and extraneous markers are used, the extraneous markers may also relate to a one-time use bit string. The one-time use extraneous markers may be defined in the look-up table provided to both sending terminal 40 and receiving terminal 46. Once used extraneous markers are discarded exactly in the same manner as the useful markers. Any repeat recurrence of an extraneous marker in subsequently received transmissions may be indicative of a fraudulent transmission and/or a compromised transmission. The advantage of using one-time use bit strings to represent both useful and extraneous markers is that this introduces a further level of unpredictability in the transmitted signal, which an eavesdropper needs to crack in order to recover the useful information, and therefore increases the security of the transmitted signal.

The relationship between the one-time use extraneous markers and the a one-time use useful markers may be predefined in the associated look up table provided to both the sending terminal 40 and the receiving terminal 46. For example, each specific one-time use useful marker may be associated with one or more specific one-time use extraneous markers. In this way, the association between useful marker and extraneous marker itself may be used as an indication of the authenticity of the received transmission. For example, if a received transmission comprises a valid useful marker that is not associated with a present valid extraneous marker, this is indicative of a fraudulent and/or compromised transmission.

To better illustrate the above described embodiment, the valid extraneous markers may relate to the bit strings 1346 and 564, which bound the concealed useful information. These one-time use bit strings may be associated with the one-time use extraneous markers defined by the bit strings 34545 and 3432. The concealed useful information relates to the bit string 123, whereas the extraneous information relates to 321 and 456. The transmitted signal comprising both useful and extraneous markers is 13426 123 564 34545 321 3432 34545 456 3432, where the spaces have been provided for illustrative purposes only. As mentioned previously, upon receipt of the transmission signal, the receiving terminal 46 analyses the signal and identifies all the markers. Furthermore, the receiving terminal 46 may carry out a lookup action to identify which one of the identified markers are useful markers (and hence associated with the useful information) and which extraneous markers are associated with the identified useful markers. Any inconsistency between the identified markers and the lookup table is indicative of a fraudulent, or compromised transmission.

The one or more markers, including the useful and/or extraneous markers, may be selected for use at random by the sending terminal 40, or they may be selected in accordance with a confidential algorithm known only to the terminals 40, 46. In the latter example, the receiving terminal 46 can determine on receipt of the transmission signal whether the markers present in the received signal are consistent with the marker selection algorithm. Any observed inconsistency may be indicative of a fraudulent and/or compromised transmission.

In practice, the terminals 40, 46 may be provided with the lookup table at the source of manufacture, or the lookup tables may be provided to the terminals from a remotely located central authority using known encryption techniques.

The presently described examples of the invention are for illustrative purposes only and are not limiting. The skilled reader will appreciate that alternative embodiments substantially based on the herein described principles could equally well be implemented without departing from the scope of the present invention, and such alternatives fall within the scope of the present invention.

The above embodiments of the invention are described for the purposes of illustrating the invention only and are not to be read as limiting the scope of the invention, which is defined by the appended claims.

The invention claimed is:

1. A method for compensating for transmission channel distortion effects for a data signal transmitted from a first computing device via the transmission channel to a second computing device comprising:
   combining communication information with extraneous information to create the data signal;
   combining the data signal with reference markers, the reference marker comprising predetermined signal parameters, to create a composite data signal, wherein the communication information is associated with a reference marker according to a first marker type and the extraneous information is associated with a reference marker according to a second marker type, and each first marker type reference marker is paired with a second marker type reference marker;
   transmitting the composite data signal from the first computing device to the second computing device;
   checking, at the second computing device, the received composite data signal to determine if each first marker type reference marker is present within the received composite data signal with its paired second marker type reference marker;
   extracting at least one reference marker and the data signal from the received composite data signal received at the second computing device;
   analysing the signal parameters of the extracted reference marker;
   comparing the analysed signal parameters of the extracted reference marker with the predetermined signal parameters of the reference marker in order to determine transmission channel distortions; and
   adjusting the extracted data signal based on the determined transmission channel distortions in order to compensate for transmission channel distortion effects.

2. The method of claim 1, wherein at least one of the reference markers comprises a unique bit string.

3. The method of claim 2, wherein the unique bit string is known to the first and second computing devices only.

4. The method of claim 1 wherein at least one of the reference markers comprises a one-time use bit string, and wherein the first and second computing devices comprise a look up table containing valid one-time use bit strings for use as reference markers, the method further comprising marking a bit string as used in the look up table when it is combined with the data signal.

5. The method of claim 4, wherein the second computing device is arranged to cross check the bit string of at least one of the received reference markers against look up tables and flag a received data signal as fraudulent in an event that the reference marker has already been marked as used.

6. The method of claim 1, wherein the data signal comprises a packet of communication information.

7. The method of claim 6, wherein the combining of the data signal with the reference markers comprises placing a start reference marker of the first marker type at a start of the packet of communication information.

8. The method of claim 7, wherein the combining of the data signal with the reference markers comprises placing an end reference marker of the first marker type at an end of the packet of communication information.

9. The method of claim 1, further comprising flagging the received composite data signal as fraudulent in an event that the first marker type reference marker is not present with its paired second marker type reference marker within the composite data signal.

10. The method of claim 1, further comprising generating the reference markers in accordance with a reference marker algorithm.

11. The method of claim 10, further comprising checking, at the second computing device, at least one of the received reference markers to determine if it is consistent with the reference marker algorithm.

12. The method of claim 11, further comprising flagging the received data signal as fraudulent in an event that the checked received reference marker is not consistent with the reference marker algorithm.

13. The method of claim 1, wherein the comparing step comprises analysing signal parameters of the extracted reference marker to determine attenuation effects of the transmission channel.

14. The method of claim 1, wherein the comparing step comprises analysing signal parameters of the extracted reference marker to determine pulse broadening effects of the transmission channel.

15. A system for compensating for transmission channel distortion effects for a data signal transmitted from a first computing device via the transmission channel to a second computing device, the system comprising:
   a combining module arranged to combine communication information with extraneous information to create the data signal, combine the data signal with reference marker markers, the reference marker markers comprising predetermined signal parameters, to create a composite data signal, wherein the communication information is associated with a reference marker according to a first marker type and the extraneous information is associated with a reference marker according to a second marker type, and each first marker type reference marker is paired with a second marker type reference marker;
   a transmitting module arranged to transmit the composite data signal from the first computing device to the second computing device;
   a verification module arranged to check, at the second computing device, the received composite data signal to determine if each first marker type reference marker is present within the received composite data signal with its paired second marker type reference marker;
an extraction module arranged to extract at least one reference marker and the data signal from the received composite data signal received at the second computing device;
an analysing module arranged to analyse the signal parameters of the extracted reference marker;
a comparison module arranged to compare the analysed signal parameters of the extracted reference marker with the predetermined signal parameters of the reference marker in order to determine transmission channel distortions; and
an adjustment module arranged to adjust the extracted data signal based on the determined transmission channel distortions in order to compensate for transmission channel distortion effects.

16. A method for compensating for transmission channel distortion effects for a data signal received from a first computing device via the transmission channel at a second computing device comprising:
receiving, at the second device, a composite data signal from the first computing device, the composite data signal comprising communication information combined with extraneous information and reference markers, the combination of the communication information with the extraneous information defining the data signal, the reference markers comprising predetermined signal parameters, wherein the communication information is associated with a reference marker according to a first marker type and the extraneous information is associated with a reference marker according to a second marker type, and each first marker type reference marker is paired with a second marker type reference marker;
checking, at the second computing device, the received composite data signal to determine if each first marker type reference marker is present within the received composite data signal with is paired second marker type reference marker;
extracting at least one reference marker and the data signal from the received composite data signal;
analysing the signal parameters of the extracted reference marker;
comparing the analysed signal parameters of the extracted reference marker with the predetermined signal parameters of the reference marker in order to determine transmission channel distortions; and
adjusting the extracted data signal based on the determined transmission channel distortions in order to compensate for transmission channel distortion effects.

\* \* \* \* \*